United States Patent
Lee et al.

(10) Patent No.: US 8,756,621 B2
(45) Date of Patent: Jun. 17, 2014

(54) APPARATUS AND METHOD FOR INFERRING SEAMLESS SERVICE PLAN OF VIDEO CONTENTS

(71) Applicant: Electronics and Telecommunications Research Institute, Daejeon (KR)

(72) Inventors: Gyu Myoung Lee, Seoul (KR); Jeong Yun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/649,674

(22) Filed: Oct. 11, 2012

(65) Prior Publication Data

US 2013/0290998 A1 Oct. 31, 2013

(30) Foreign Application Priority Data

Apr. 27, 2012 (KR) .................. 10-2012-0044512

(51) Int. Cl.
*H04H 60/32* (2008.01)
(52) U.S. Cl.
USPC .................. 725/14; 725/10; 725/12; 725/78

(58) Field of Classification Search
USPC .......................... 725/10, 12, 14, 78
See application file for complete search history.

(56) References Cited

U.S. PATENT DOCUMENTS

| | | |
|---|---|---|
| 2009/0027222 A1* | 1/2009 | Larsson et al. ............. 340/686.6 |
| 2010/0042909 A1 | 2/2010 | Tanahashi |
| 2011/0179146 A1* | 7/2011 | Park ............................. 709/219 |
| 2011/0314134 A1* | 12/2011 | Foti .............................. 709/219 |
| 2012/0064887 A1* | 3/2012 | Shobatake ................. 455/432.1 |

* cited by examiner

*Primary Examiner* — Mulugeta Mengesha
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed are an apparatus and method for inferring a service plan for seamlessly providing an IPTV service. The present invention proposes a context inference algorithm for performing multiple-criteria decision-making using Analytic Hierarchy Process (AHP) for context element evaluation through a context inference apparatus for providing a seamless IPTV service using a context awareness technology for recognizing device change and environmental change in a ubiquitous home networking environment including various types of information terminals.

16 Claims, 8 Drawing Sheets

|  | P1 | P2 | P3 | P4 |
|---|---|---|---|---|
| P1 | S1/S1 | S1/S2 | S1/S3 | S1/S4 |
| P2 | S2/S1 | S2/S2 | S2/S3 | S2/S4 |
| P3 | S3/S1 | S3/S2 | S3/S3 | S3/S4 |
| P4 | S4/S1 | S4/S2 | S4/S3 | S4/S4 |

FIG. 6b

|  | P1 | P2 | P3 | P4 | PRIORITY |
|---|---|---|---|---|---|
| P1 | $P_{11}$ | $P_{12}$ | $P_{13}$ | $P_{14}$ | N1 |
| P2 | $P_{21}$ | $P_{22}$ | $P_{23}$ | $P_{24}$ | N2 |
| P3 | $P_{31}$ | $P_{32}$ | $P_{33}$ | $P_{34}$ | N3 |
| P4 | $P_{41}$ | $P_{42}$ | $P_{34}$ | $P_{44}$ | N4 |

FIG. 7
Algorithm

*For each Goal*
    *For each Level = n;*
        *If n=1;*
            *for level n and n+1;*
            *find paired Option comparison matrix level n with respect to Goal;*
            *find paired Property comparison matrix level n+1 with respect to Option and Goal;*
            *ignore less impact attributes/properties;*
            *Calculate normalized matrix [$\sum_{i=1}^{n} p_{ij} = 1$];*

*Priority Vector $W_i = \frac{1}{n}\sum_{j=1}^{n} p_{ij}$;*

*Calculate composite matrix for level n & n+1;*
            *end*
        *if n>1;*
            *associate sub-criteria to Goal by distributing score proportionally;*
            *Calculate composite matrix for level n & n+1;*
            *ignore less impact attributes/properties;*
        *end*
    *end*
*end*

FIG. 8

$\mathbf{P} =$

|    | P1  | P2  | P3  | P4  | sum  |       |
|----|-----|-----|-----|-----|------|-------|
| P1 | 3/8 | 3/8 | 3/8 | 3/8 | 12/8 | 37.5% |
| P2 | 1/8 | 1/8 | 1/8 | 1/8 | 4/8  | 12.5% |
| P3 | 1/8 | 1/8 | 1/8 | 1/8 | 4/8  | 12.5% |
| P4 | 3/8 | 3/8 | 3/8 | 3/8 | 12/8 | 37.5% |

$\mathbf{O} =$

| P1 | O1   | O2   | O3   | sum   |        |
|----|------|------|------|-------|--------|
| O1 | 5/11 | 5/11 | 5/11 | 15/11 | 45.45% |
| O2 | 3/11 | 3/11 | 3/11 | 09/11 | 27.27% |
| O3 | 3/11 | 3/11 | 3/11 | 09/11 | 27.27% |

|    | P1     | P2    | P3    | P4    | Composite Weight |
|----|--------|-------|-------|-------|------------------|
| W  | 0.375  | 0.125 | 0.125 | 0.375 |                  |
| O1 | 45.45% | 21.1% | 33.3% | 43.6% | 40.19%           |
| O2 | 27.27% | 52.3% | 35.6% | 44.1% | 37.76%           |
| O3 | 27.27% | 26.6% | 31.1% | 12.3% | 22.05%           |

FIG. 9

APPARATUS AND METHOD FOR INFERRING SEAMLESS SERVICE PLAN OF VIDEO CONTENTS

CROSS-REFERENCE TO RELATED APPLICATIONS

This application claims priority to and the benefit of Korean Patent Application No. 10-2012-0044512 filed in the Korean Intellectual Property Office on Apr. 27, 2012, the entire contents of which are incorporated herein by reference.

TECHNICAL FIELD

The present invention relates to an apparatus and method for inferring a service plan for seamlessly providing a video content service. More particularly, the present invention relates to an apparatus and method for inferring a service plan for seamlessly providing an Internet protocol television (IPTV) service.

BACKGROUND ART

A context awareness technology allows an IPTV service to be more user-centric and adaptive to user preferences. In a real environment, several types of context awareness factors may be considered, which dynamically vary.

In a home networking environment, a context awareness IPTV service is affected by some factors such as location, time, device performance, network property, etc. In a home networking environment, context information is obtained through a sensor for sensing environmental factors such as voice, motion, temperature, moisture, brightness, etc. Radio frequency identification (RFID) is a common technology for acquiring the context information, because of small size and low fabrication cost thereof. All the context information, which is obtained in this manner, is gathered to an indoor local context manager (for example, set-top box). The local context manager is not smart enough to make a context inference determination related to flow control, service quality management, etc. on the basis of the context information. When the context inference determination is made in consideration of several factors, the IPTV service may be frequently interrupted.

SUMMARY OF THE INVENTION

The present invention has been made in an effort to provide an apparatus and method for inferring a seamless service plan of video contents, which evaluate the context information with analytic hierarchy process (AHP) to infer the plan for seamlessly providing an IPTV service.

An exemplary embodiment of the present invention provides an apparatus for inferring a seamless service plan of video contents including: a context element tracking unit tracking context elements predetermined or variable depending on a user's environment; and a seamless service plan inference unit comparatively analyzing attributes of one of the tracked context elements and then comparatively analyzing attributes of the context elements in the same class to infer the seamless service plan of the video contents.

The seamless service plan inference unit may include: an attribute comparison matrix generation unit generating an attribute comparison matrix for a specific context element using a relation score between an attribute score selected in the specific context element and another attribute score; a weight calculation unit calculating a weight for each attribute of the specific context element on the basis of the relation score; an attribute contribution definition unit defining on the basis of the calculated weight whether each attribute of the specific context element is contributed when the plan is determined; and a priority calculation unit calculating a priority for each attribute of the specific context element according to the defined attribute contribution.

The seamless service plan inference unit may comparatively evaluate different context elements on the basis of the priority to infer the plan when the priority is calculated for each attribute of the specific context element.

The weight calculation unit may calculate the weight on the basis of a ratio of each relation score to a sum of the relation scores.

The attribute contribution definition unit may define the contribution or not on the basis of a ratio of each weight to an average of weights satisfying predetermined criteria.

The attribute comparison matrix generation unit may use as the relation score a score obtained by dividing the selected attribute score by the other attribute score.

The context element tracking unit may track devices, which are located in a predetermined zone, as static context elements in the predetermined context elements and track at least one of a user's location and a network context based on the user's location and a user's request for service processing as dynamic context elements in variable context elements depending on a user environment.

The context element tracking unit may track devices having different preferences as the static context elements. The seamless service plan inference unit may define a device for providing the seamless service of the video contents in consideration of the user's location first and the device's performance second.

The seamless service plan inference unit may provide an IPTV service in a home networking environment as the seamless service of the video contents.

Another exemplary embodiment of the present invention provides a method of inferring a seamless service plan of video contents including: a context element tracking step of tracking context elements predetermined or variable depending on a user's environment; and a seamless service plan inference step of comparatively analyzing attributes of one of the tracked context elements and then comparatively analyzing attributes of the context elements in the same class to infer the seamless service plan of the video contents. The seamless service plan inference step may include: an attribute comparison matrix generation step of generating an attribute comparison matrix for a specific context element using a relation score between an attribute score selected in the specific context element and another attribute score; a weight calculation step of calculating a weight for each attribute of the specific context element on the basis of the relation score; an attribute contribution definition step of defining on the basis of the calculated weight whether each attribute of the specific context element is contributed when the plan is determined; and a priority calculation step of calculating a priority for each attribute of the specific context element according to the defined attribute contribution.

The seamless service plan inference step may include comparatively evaluating different context elements on the basis of the priority to infer the plan when the priority is calculated for each attribute of the specific context element.

The weight calculation unit step may include calculating the weight on the basis of a ratio of each relation score to a sum of the relation scores.

The attribute contribution definition step may define the contribution or not on the basis of a ratio of each weight to an average of weights satisfying predetermined criteria.

The attribute comparison matrix generation step may use as the relation score a score obtained by dividing the selected attribute score by the other attribute score.

The context element tracking step may including tracking devices, which are located in a predetermined zone, as static context elements in the predetermined context elements and tracking at least one of a user's location and a network context based on the user's location and a user's request for service processing as dynamic context elements in variable context elements depending on a user environment. The context element tracking step may track devices having different preferences as the static context elements.

The seamless service plan inference step may determine a device for providing the seamless service of the video contents in consideration of the user's location first and the device's performance second.

The seamless service plan inference step may include providing an IPTV service in a home networking environment as the seamless service of the video contents.

According to exemplary embodiments of the present invention which evaluates the context element with the AHP to infer the seamless service plan of the video contents, it is possible to avoid complicated and unnecessary calculation during an analysis process and provide a seamless IPTV service even when a lot of context element is simultaneously tracked or several environmental factors are dynamically changed. It is also possible to frequently perform an evaluation on the basis of a hierarchical context tree, thereby suitably operating with even dynamic data as well as static data.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and a user's environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 1:
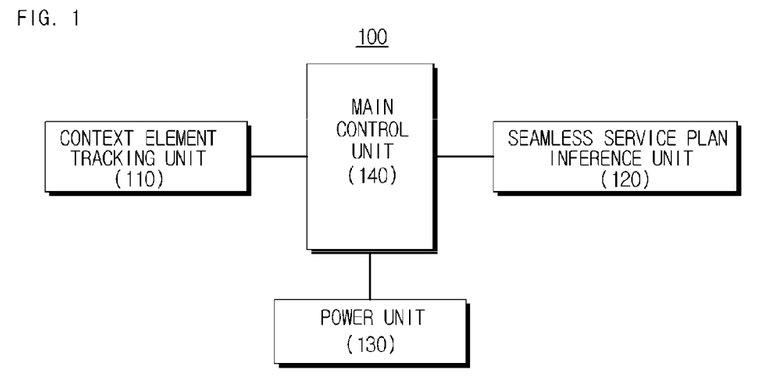
FIG. 1 is a block diagram schematically showing an apparatus for inferring a seamless service plan of video contents according to an exemplary embodiment of the present invention.
Figure 2:
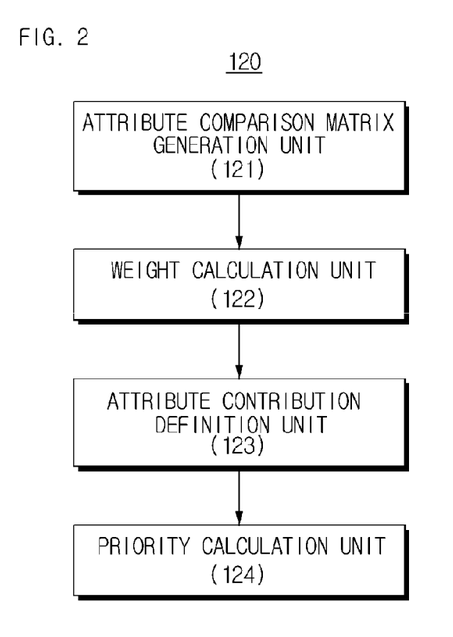
FIG. 2 is a block diagram showing in detail an inner configuration of the inference apparatus shown in FIG. 1.

FIG. 1 is a block diagram schematically showing an apparatus for inferring a seamless service plan of video contents according to an exemplary embodiment of the present invention. FIG. 2 is a block diagram showing in detail an inner configuration of the inference apparatus as shown in FIG. 1. The following description will be made with reference to FIGS. 1 and 2.

According to FIG. 1, the apparatus for inferring a seamless service plan of video contents 100 includes a context element tracking unit 110, a seamless service plan inference unit 120, a power unit 130, and a main control unit 140.

The apparatus for inferring a seamless service plane of video contents 100 is a context inference apparatus for providing a seamless IPTV service using a context awareness technology for recognizing device change and environmental change in a ubiquitous home networking environment including various types of information terminals, which proposes a context inference algorithm for multiple-criteria decision-making using the AHP for context element evaluation. Hereinafter, the apparatus for inferring a seamless service plan of video contents 100 is simply referred to as an inference apparatus 100.

The context element tracking unit 110 tracks context factors which are predetermined or variable depending on a user's environment.

The context element tracking unit 110 tracks devices, which are located in a predetermined zone, as static context elements in predetermined context elements. The context element tracking unit 110 tracks at least one of a user's location and a network context based on the user's location and a user's service processing request as dynamic context elements in dynamic context elements depending on a user's environment. The context element tracking unit 110 may track devices having different preferences as the static context elements.

The seamless service plan inference unit 120 comparatively analyzes attributes of one of the tracked context elements and then attributes of the context elements in the same class to infer a seamless service plan for providing a seamless service of video contents. The seamless service plan inference unit 120 may provide an IPTV service in a home networking environment where an event is relatively less changed as the seamless service of video contents.

As shown in FIG. 2, the seamless service plan inference unit 120 may include an attribute comparison matrix generation unit 121, a weight calculation unit 122, an attribute contribution definition unit 123, and a priority calculation unit 124.

The attribute comparison matrix generation unit 121 generates an attribute comparison matrix for a specific context element using relation scores between an attribute score selected in the specific context element and other attribute scores. The attribute comparison matrix generation unit 121 may use scores, which are obtained by dividing the selected attribute score by the other attribute scores, as the relation scores.

The weight calculation unit 122 calculates a weight for each attribute of the specific context element using the relation scores. The weight calculation unit 122 may calculate the weight on the basis of a ratio of each relation score to a sum of all the relation scores.

The attribute contribution definition unit 123 defines on the basis of the calculated weights whether each attribute of the specific context element is contributed when the seamless service plan is determined. The attribute contribution definition unit 123 may define whether the attribute is contributed, on the basis of a ratio of each weight to an average of weights satisfying predetermined criteria.

The priority calculation unit 124 calculates a priority for each attribute of the specific context element according to whether the attribute is contributed, which is defined.

When the priority is calculated for each attribute of the specific context element, the seamless service plan inference unit 120 may comparatively evaluate different context elements on the basis of the priority to infer the seamless service plan.

The seamless service plan inference unit 120 may determine a device for providing the seamless service of video contents in consideration of the user's location first and the device's performance second. In this case, the seamless service plan inference unit 120 may determine a device, which is located nearest to the user's current location, as the device for providing the video content service. However, there may be a plurality of devices which can provide the video content service to the user at the user's current location. Accordingly, as described above, the seamless service plan inference unit 120 may determine a device located nearest to a user's current location as the device for providing the seamless service of video contents. The seamless service plan inference unit 120 may determine a device having a highest resolution as the device for providing the video content service in consideration of video qualities of the plurality of devices. The seamless service plan inference unit 120 may seamlessly provide the video content service to a device accessed by a user, using a handover function, when the user's location changes.

The power unit 130 supplies power to each element constituting the inference apparatus 100.

The main control unit 140 controls an entire operation of each element constituting the inference apparatus 100.

The present invention proposes a new context inference technique for addressing context element and a decision-making system using the AHP for providing the seamless IPTV service through context awareness in a ubiquitous home networking environment including various types of devices. The AHP is a tool for solving a multiple-criteria decision-making problem, which may be implemented by a general mathematic model related to context element evaluation.

A time shift TV is a typical example applying the IPTV service using the context awareness technology. The time shift TV may support trick mode operations such as forward, backward, pause, play, etc. and advantageously provide flexibility to a subscriber in a time domain for desired contents. When a subscriber watches TV contents on a large-screen TV in a living room and moves to a bedroom, this context awareness technology is aware of this movement and moves the TV contents to a small-screen TV in the bedroom, enabling the subscriber to continuously watch the TV contents at a desired time. That is, a ubiquitous service environment may be provided where desired contents may be watched at any time, regardless of time, place, device, etc.

The AHP technology, which is applied to the present invention for context inference, may solve a multiple-criteria decision-making problem in which one or more decision makers participate. This is a technology utilized to select an optimal alternative by understanding evaluation criteria and alternatives, establish a plan under data incompletion, support decision-making under time pressure, and establish a corresponding plan under opinion conflict among departments. The most important consideration in the AHP is to prioritize several factors significantly affecting a final decision. This allows available information to be periodically checked in response to dynamic change in criteria or importance and simultaneously allows some factors to be ruled out in the final decision because of insufficient information or low weight.

In a case where a seamless IPTV service is provided in a ubiquitous home networking environment, the present invention aims to provide the context inference technique for enabling an optimal decision-making suitable for a service environment on the basis of the context element through the context awareness mechanism for receiving a streaming of desired IPTV contents and the service anywhere at any time even when a terminal is changed. The goal of the present invention is accomplished by applying the AHP which divides decision-making into several sub-parts so as to reduce complicated and unnecessary calculation and analysis process of a context inferrer. In this case, a context inference mechanism is provided to make an optimal decision on the basis of a variety of context element for users who intend to receive the IPTV service to use the context awareness technology.

Figure 3:
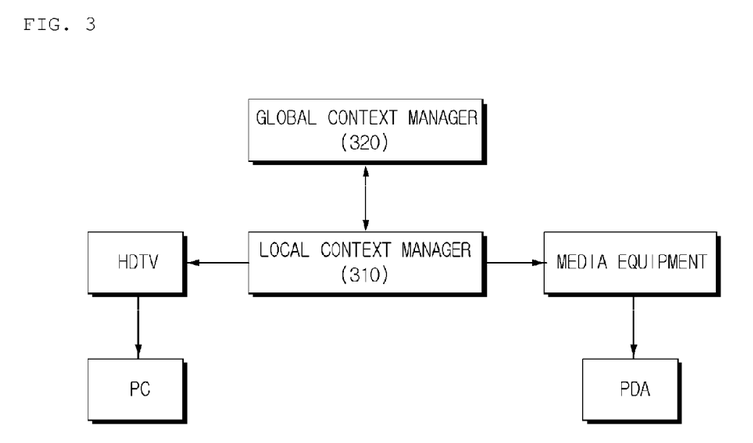
FIG. 3 is a block diagram showing an IPTV service configuration in a ubiquitous home networking environment according to the present invention.

FIG. 3 is a block diagram showing an IPTV service configuration in a ubiquitous home networking environment according to the present invention, which shows several devices related to context awareness.

A context manager is used to continuously track context element on a subscriber in proposed environment. Request for a seamless time shift TV is closely related to timing information on the subscriber because all services are implemented in a time domain. A local context manager 310 tracks the timing information on the subscriber while current contents are tagged, in order to support the trick mode operations (for example, play, forward, backward, etc.) and any device in the same profile or domain.

The same content may need to be delivered to two or more devices simultaneously. This may occur during a handover which is caused by a subscriber changing from an old device to a new device. This means more bandwidth is needed for each subscriber during the handover.

The local context manager 310 identifies all devices supported in a target environment and exchanges information therebetween. When the handover is performed in a home from one device to another device, the local context manger 310 sends necessary information to a remote server for adaptation of media format, resolution, volume level, etc. Herein, the local context manage 310 is responsible for local decision such as the handover within a home environment. When the subscriber goes out from his/her home, tasks related to this are sent to a global context manager 320 in a carrier network. The global context manger 320 is strategically located close to an access network in order for a network carrier to provide a brief response.

Figure 4:
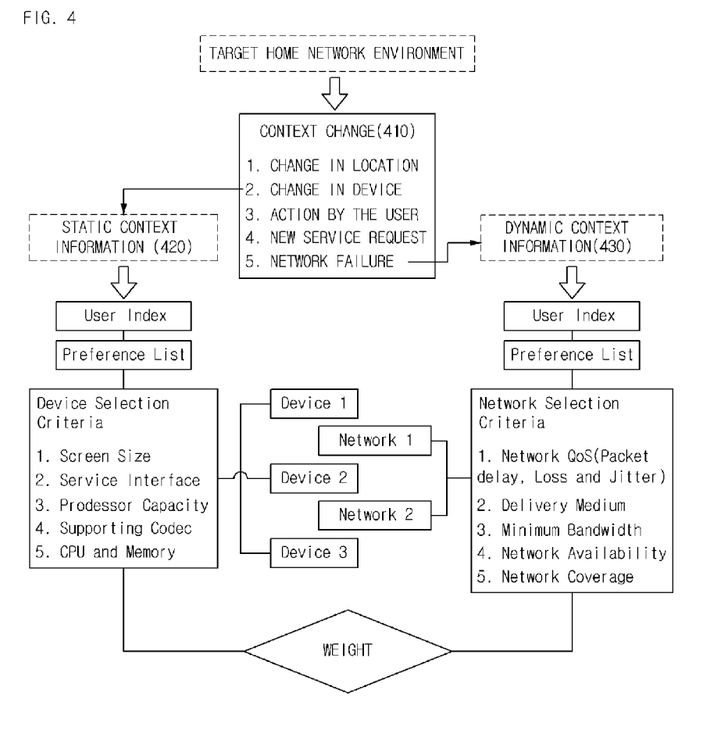
FIG. 4 is a block diagram showing a decision-making process of a context inferrer for providing a context awareness IPTV service according to the present invention.

FIG. 4 is a block diagram showing a decision-making process of a context inferrer for providing a context awareness IPTV service according to the present invention. In the proposed method for decision-making based on the context element, static and dynamic properties of data are used.

The present invention considers context changes 410 such as change in device, change in location, action by the user: play; pause; and stop, network failure, new service request, etc. These context changes may be caused by the subscriber or environmental and social interaction. For example, it may be assumed that, when a subscriber watches a video and goes out from his/her home, the video content is delivered to a mobile device.

The context awareness service should support a function of continuously and seamlessly delivering a video stream to a subscriber at any time. The context awareness service is utilized as a core technology for implementing concepts such as "smart home" and "contents following user". To make the implementation, however, correct context element should be provided to a context inferrer which can induce a proper decision.

The ubiquitous networking environment supports a type of environment that can be accessed everywhere at any time in consideration that location of the subscriber frequently changes. The change in location should enable the context inferrer to select a suitable network which may provide the best quality and handover from among networks accessible by the subscriber.

In order to facilitate trick mode operations for a VOD and a time shift TV, subscriber's activities and ambient environment for providing continuity of a seamless service should be tracked and then the context element should be properly processed to provide continuity of a seamless service. In particular, network supportability for delivering desired contents with a minimum delay, jitter, and packet loss is also important.

The context element is classified into two types: static context element 420 and dynamic context element 430. The static context element 420 is information which is fixed by a device, subscriber, carrier, or vendor. The dynamic context element 430 is information which varies depending on location, system conditions, and network context. The dynamic context element 430 is affected by a lot of other external factors and thus is difficult to predict. Accordingly, there is a need for a mechanism for predicting an expected result on the basis of previous information. This information may be weighted to provide a service suitable for a service environment.

Figure 5:
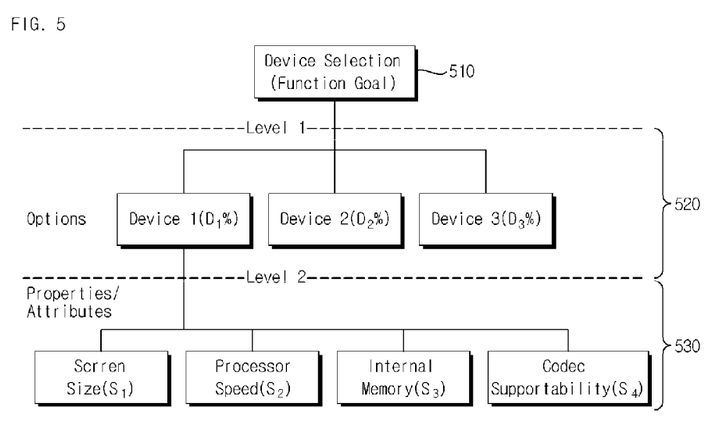
FIG. 5 illustrates an expanded sub-tree for device selection using a context awareness technology according to the present invention.

FIG. 5 shows an expanded sub-tree for device selection using a context awareness technology according to the present invention. In FIG. 5, when a mathematical model is applied to a scenario proposed in the present invention, all context elements are considered to be put in a single hierarchical tree. For example, the scenario described in FIG. 4 includes five context changes. Basically, these changes may be defined as branches of the tree as shown in FIG. 5.

FIG. 5 shows a sub-tree for selecting the most suitable device for delivering context element about change in device. To accomplish this goal 510, a first level 520 indicates device 1, device 2, and device 3, which have different user preferences. Herein, a sum of the preferences (a sum of preferences of device 1, device 2, and device 3) is 100%. Each device has a unique property list 530 which describes attributes of the device. However, the impact of the property of the device continuously changes. Accordingly, there is a need for a comparison matrix for indicating the impact of all attributes of each device, relative to other devices.

Figure 6A:
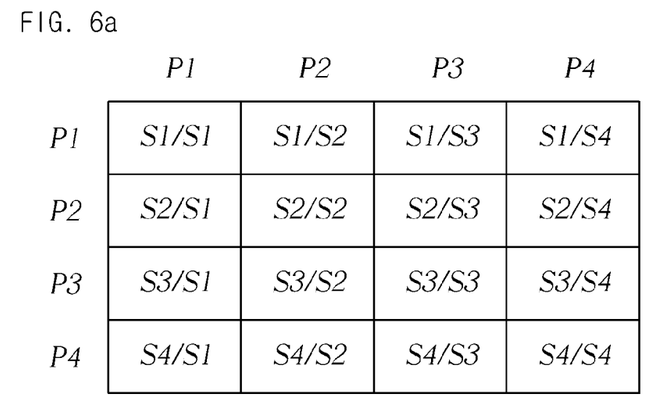
FIGS. 6a and 6b illustrates a normalized principle vector, a vector defining relative influence of other attributes, and an algorithm for finding a composition matrix from two matrixes P and O, which are applied to a context inference step mechanism using the AHP proposed in the present invention.
Figure 6B:
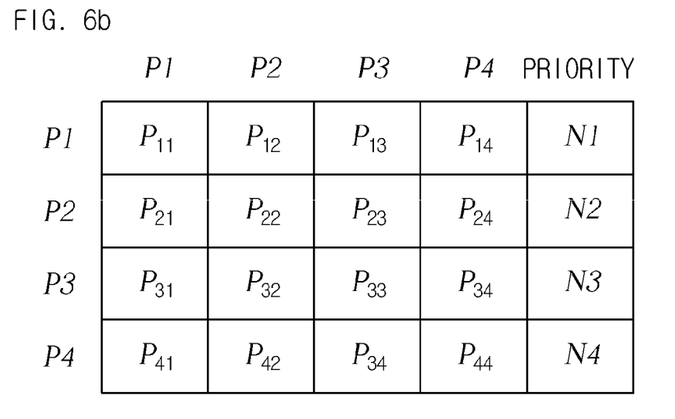

FIGS. 6a and 6b are a diagram illustrating a normalized principle vector, a vector defining relative influence of other attributes, and an algorithm for finding a composition matrix from two matrixes P and O, which are applied to a context inference step mechanism using the AHP proposed in the present invention.

FIGS. 6a and 6b show a process of calculating the comparison matrix proposed in the present invention. The device property list has a score corresponding to each property related to the goal (that is, change in device). Other goals may be considered together depending on the context. A single goal or one goal at a time point is considered in the hierarchical structure of the present invention.

Step 1: calculate the comparison matrix for attributes in a second level shown in FIG. 5. These scores are expressed as Equation (1).

$$p_{ij} = \frac{s_i}{s_j} \qquad \text{Equation (1)}$$

where $P_{ij}$ is a ratio of a score given to attribute i to a score given to attribute j. The relation of $P_{ij}$ and $P_{ji}$ is $P_{ij}=1/P_{ji}$. This scenario aims to separate a fact highly affecting the goal and remove other facts minimizing complexity of context inference.

Step 2: calculate a normalized relative weight on each element in the matrix. The weight calculation follows Equation (2).

$$P_{ij} = \frac{p_{ij}}{\sum_{i=1}^{n} p_{ij}} \left( \sum_{i=1}^{n} p_{ij} = 1 \right) \qquad \text{Equation (2)}$$

Step 3: find a normalized principle vector which is found by averaging elements on a single column. The principle vector may be found using Equation (3).

$$N_i = \frac{1}{n} \sum_{j=1}^{n} P_{ij} \qquad \text{Equation (3)}$$

where n denotes the number of elements on a single column. This vector defines to which extent each attribute has an influence on the final decision. FIG. 6a shows the normalized principle vector.

Step 4: calculate a vector defining relative influences of other attributes. N denotes an influence on each attribute found by the normalized eigen vector, as shown in Equation (4).

$$\sum_{i=1}^{n} N_i = 100\%$$ Equation (4)

FIG. 6b shows the vector defining the relative influences of other attributes.

Next, options in the first level, which are related with an object or goal of the hierarchical structure, follow the same procedure.

Step 5: there are two types of matrixes. That is, there are a property priority matrix P and an option priority matrix O. A composition matrix C is evaluated with an operation {P, O}. This operation is related with a final goal which should be maximized, and compares different options in the first level. Herein, an algorithm for evaluating a scenario referred to now is defined.

Rule: for a hierarchy tree exceeding the second level, a problem may be divided into several sub-problems to be partially solved. An algorithm which is applied to the present invention may be applied to any level on the hierarchical structure where the best option and attributes may be selected. The same operation may be repeated to prioritize the attributes and then select one between the options. The partial minimization of the tree helps in reducing the overall complexity of the hierarchical structure and the number of expected calculations for the final goal.

Figure 7:
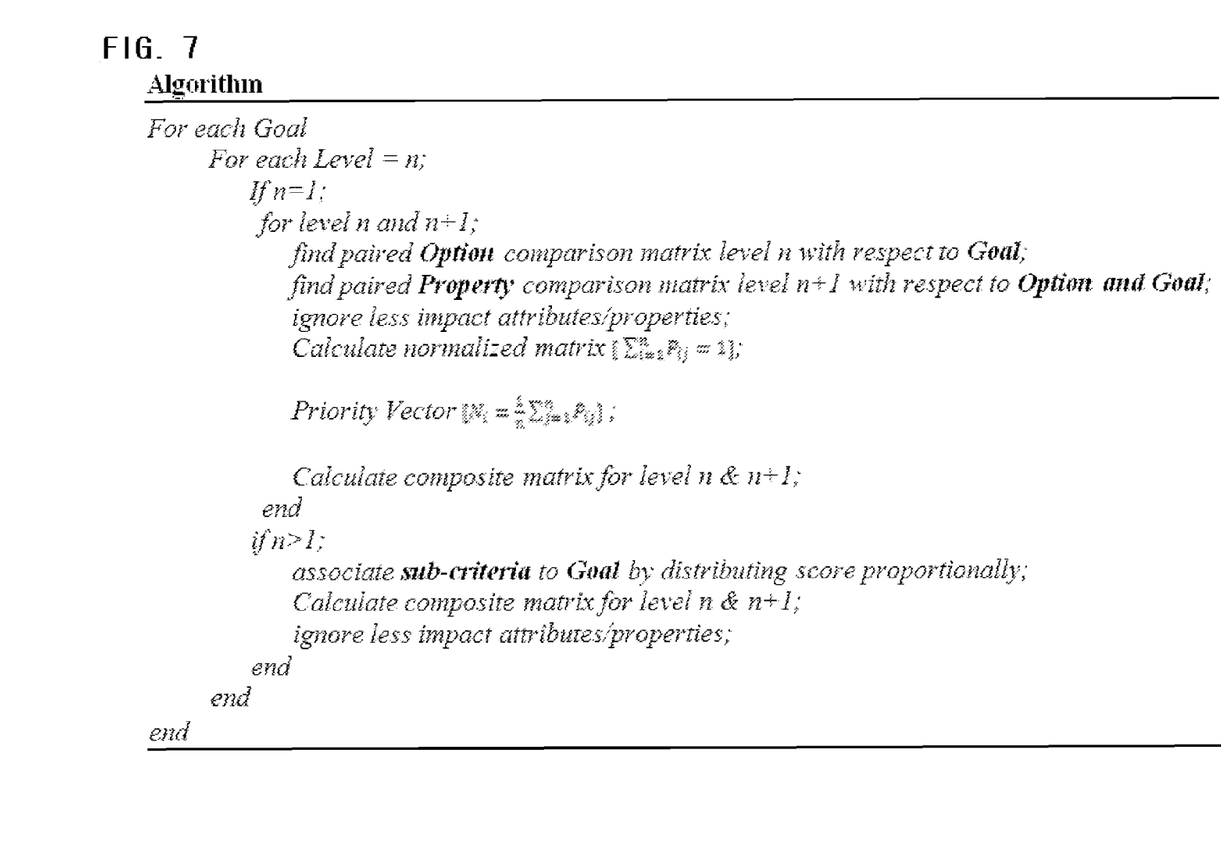
FIG. 7 illustrates an algorithm for finding a composition matrix from two matrixes P and O according to the technique proposed in the present invention.
Figure 8:
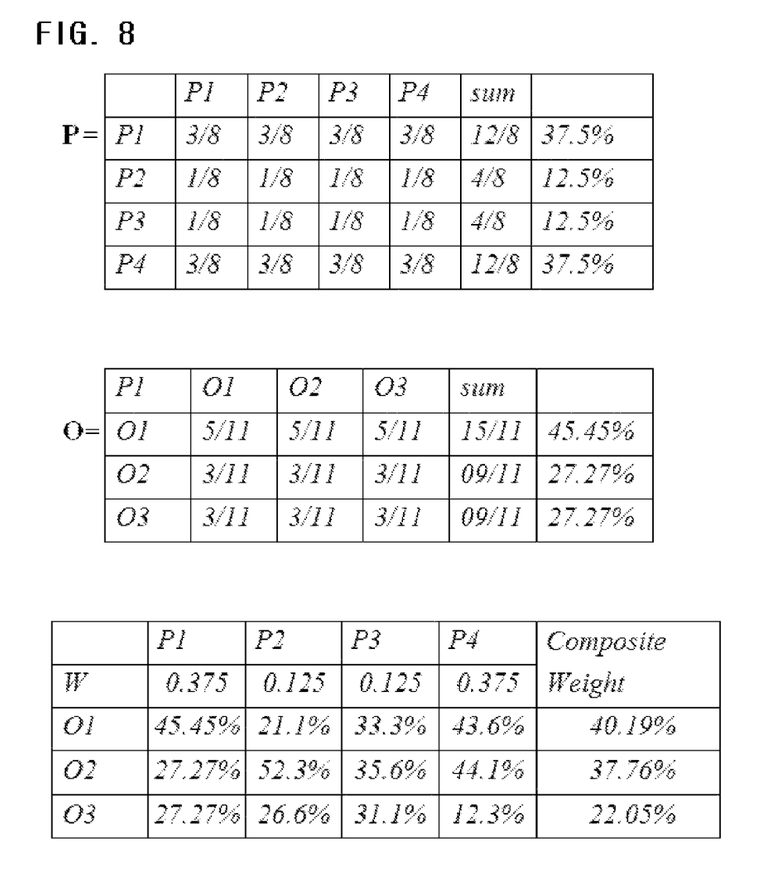
FIG. 8 illustrates a matrix calculation technique utilizing the algorithm illustrated in FIG. 7.

FIG. 7 is a diagram illustrating an algorithm for finding a composition matrix from two matrixes P and O according to the technique proposed in the present invention. FIG. 8 illustrates a matrix calculation technique utilizing the algorithm illustrated in FIG. 7.

FIG. 7 is a sample scenario for a technique proposed in the present invention. The present invention proposes a matrix calculation technique on the basis of context element so as to reduce the complexity of a processing process as an example shown in FIG. 7. This process is controlled by the context inferrer which is responsible for context element processing. In the proposed method, scores ranging 1 to 9 are given. That is an option and a property, or attributes are given the scores ranging 1 to 9 according to the influence based on the final goal. On the basis of this, an example of a technique of calculating a context evaluation is shown with reference to FIG. 8.

The matrix P is obtained on the basis of a goal or route in a defined context tree. Next, a comparison matrix for comparing different properties or attributes may each be found. In an environment defined for all options and goals, a comparison matrix of property-1 (P1) is found with respect to given options. A score is determined by an opinion of an expert who has detailed knowledge about a system and final goal. Herein, the matrix O denotes an option comparison matrix corresponding to the property P1. This denotes a composition matrix which expresses relative grading of options for the goal. Finally, the ratio of O1:O2:O3 may be found as 1.82:1.71:1. This means that option 1 is 1.82 times more beneficial than option 3 with respect to property 1. This method enables the decision-making of the context element to be least complicated. The hierarchy tree defined for context evaluation may be simplified.

Figure 9:
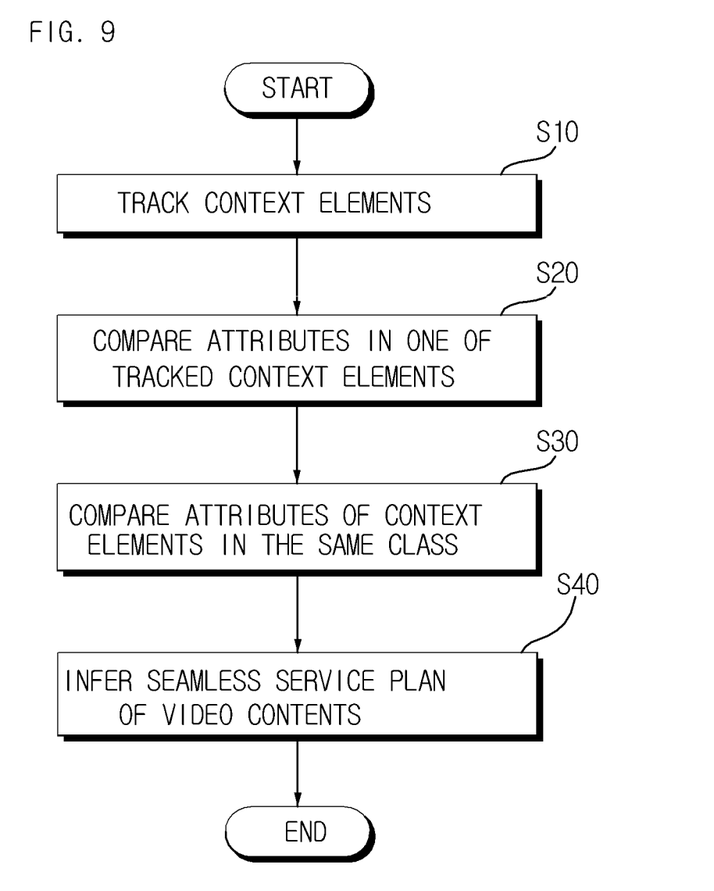
FIG. 9 is a flow chart schematically illustrating a method of inferring a seamless service plan of video contents according to an exemplary embodiment of the present invention.

FIG. 9 is a flow chart schematically illustrating a method of inferring a seamless service plan of video contents according to an exemplary embodiment of the present invention.

First, the context element tracking unit tracks context factors which are predetermined or variable depending on a user's environment (S10). In this step, the context element tracking unit tracks devices, which are located in a predetermined zone, as static context elements in the predetermined context elements. The context element tracking unit tracks at least one of a user's location and a network context based on the user's location and a user's request for service processing as dynamic context elements in variable context elements depending on a user's environment. In this step, the context element tracking unit may track devices having different preferences as the static context elements.

The seamless service plan inference unit comparatively analyzes attributes of one of the tracked context elements (S20) and then comparatively analyzes attributes of the context elements in the same class (S30) to infer a seamless service plan for providing a seamless service of video contents (S40).

The step S20 may be specified as follows. The attribute comparison matrix generation unit generates an attribute comparison matrix for a specific context element using relation scores between an attribute score selected in the specific context element and other attribute scores. The attribute comparison matrix generation unit may use as the relation score a score obtained by dividing the selected attribute score by the other attribute score. The weight calculation unit calculates a weight for each attribute of a specific context element using the relation score. The weight calculation unit may calculate the weight on the basis of a ratio of each relation score to a sum of the all the relation scores. The attribute contribution definition unit 123 defines on the basis of the calculated weights whether each attribute of the specific context element is contributed when the seamless service plan is determined. The attribute contribution definition unit may define the contribution or not on the basis of a ratio of each weight to an average of weights satisfying predetermined criteria. The priority calculation unit calculates a priority for each attribute of the specific context element according to whether the attribute is contributed.

When the priority is calculated for each attribute of the specific context element, the seamless service plan inference unit may comparatively evaluate different context elements on the basis of the priority to infer the seamless service plan.

The seamless service plan inference unit may determine a device for providing the seamless service of video contents in consideration of the user's location first and the device's performance second.

The seamless service plan inference unit may provide an IPTV service in a home networking environment as the seamless service of video contents.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for inferring a seamless service plan of video contents comprising:
   a context element tracking unit tracking context elements predetermined or variable depending on a user's environment; and
   a seamless service plan inference unit comparatively analyzing attributes of one of the tracked context elements and then comparatively analyzing attributes of the context elements in the same class to infer the seamless service plan of the video contents,
      wherein the seamless service plan inference unit determines a weight for each of the attributes of a specific context element and defines a contribution for each of the attributes in order to infer the seamless service plan based on the weight and a priority for each of the attributes according to the defined contribution.

2. The apparatus of claim 1, wherein the seamless service plan inference unit comprises:
   an attribute comparison matrix generation unit generating an attribute comparison matrix for the specific context element using a relation score between an attribute score selected in the specific context element and another attribute score;
   a weight calculation unit calculating the weight for the each attribute of the specific context element on the basis of the relation score;
   an attribute contribution definition unit defining the contribution for each of the attribute for inferring the seamless service plan when the seamless service plan is determined based on the weight; and
   a priority calculation unit calculating the priority for each attribute of the specific context element according to the defined attribute contribution.

3. The apparatus of claim 2, wherein the seamless service plan inference unit comparatively evaluates different context elements on the basis of the priority to infer the plan when the priority is calculated for each attribute of the specific context element.

4. The apparatus of claim 2, wherein the weight calculation unit calculates the weight on the basis of a ratio of each relation score to a sum of all the relation scores.

5. The apparatus of claim 2, wherein the attribute contribution definition unit defines the contribution or not on the basis of a ratio of each weight to an average of weights satisfying predetermined criteria.

6. The apparatus of claim 2, wherein the attribute comparison matrix generation unit uses as the relation score a score obtained by dividing the selected attribute score by the other attribute scores.

7. The apparatus of claim 1, wherein the context element tracking unit tracks devices, which are located in a predetermined zone, as static context elements in the predetermined context elements and tracks at least one of a user's location and a network context based on the user's location and a user's request for service processing as dynamic context elements in variable context elements depending on a user's environment.

8. The apparatus of claim 7, wherein the context element tracking unit tracks as the static context elements devices having different preferences.

9. The apparatus of claim 1, wherein the seamless service plan inference unit determines a device for providing the seamless service of the video contents in consideration of a user's location first and device's performance second.

10. The apparatus of claim 1, wherein the seamless service plan inference unit provides an IPTV service in a home networking environment as the seamless service of the video contents.

11. A method of inferring a seamless service plan of video contents comprising:
   a context element tracking step of tracking context elements predetermined or variable depending on a user's environment; and
   a seamless service plan inference step of comparatively analyzing attributes of one of the tracked context elements and then comparatively analyzing attributes of the context elements in the same class to infer the seamless service plan of the video contents,
      wherein the seamless service plan inference unit determines a weight for each of the attributes of a specific context element and defines a contribution for each of the attributes in order to infer the seamless service plan based on the weight and a priority for each of the attributes according to the defined contribution.

12. The method of claim 11, wherein the seamless service plan inference step comprises:
   an attribute comparison matrix generation step of generating an attribute comparison matrix for the specific context element using a relation score between an attribute score selected in the specific context element and another attribute score;
   a weight calculation step of calculating the weight for the each attribute of the specific context element using the relation score;
   an attribute contribution definition step defining the contribution for each of the attribute for inferring the seamless service plan when the seamless service plan is determined based on the weight; and
   a priority calculation step of calculating the priority for each attribute of the specific context element according to the defined attribute contribution.

13. The method of claim 12, wherein the seamless service plan inference step comprises comparatively evaluating different context elements on the basis of the priority to infer the plan when the priority is calculated for each attribute of the specific context element.

14. The method of claim 12, wherein the weight calculation step comprises calculating the weight on the basis of a ratio of each relation score to a sum of the relation scores, or
   the attribute contribution definition step comprises defining the contribution or not on the basis of a ratio of each weight to an average of weights satisfying predetermined criteria, or
   the attribute comparison matrix generation step uses as the relation score a score obtained by dividing the selected attribute score by the other attribute score.

15. The method of claim 11, wherein the context element tracking step comprises tracking devices, which are located in a predetermined zone, as static context elements in the predetermined context elements and tracking at least one of a user's location and a network context based on the user's location and a user's request for service processing as dynamic context elements in variable context elements depending on a user's environment.

16. The method of claim 11, wherein the seamless service plan inference step comprises providing an IPTV service in a home networking environment as the seamless service of the video contents.

* * * * *